Dec. 8, 1936.   R. O. HAMILL   2,063,735

MAXIMUM DEMAND METER

Filed April 28, 1934   2 Sheets-Sheet 1

INVENTOR
R. O. Hamill
BY
Thomas Howe
ATTORNEY

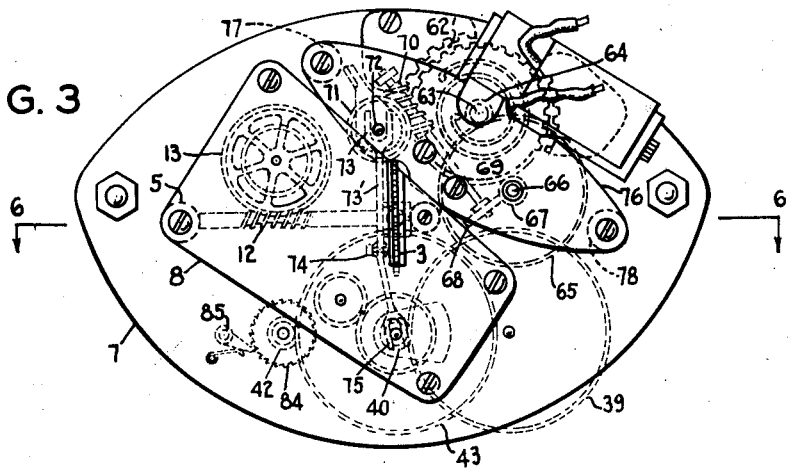

Patented Dec. 8, 1936

2,063,735

UNITED STATES PATENT OFFICE 2,063,735

MAXIMUM DEMAND METER

Ret O. Hamill, New York, N. Y., assignor to Sangamo Electric Company, Springfield, Ill., a corporation of Illinois Application April 28, 1934, Serial No. 722,905

13 Claims. (Cl. 171—34)

This invention relates to means, applicable to electric metering apparatus, whereby the maximum demands for electricity through the metering apparatus may be ascertained.

The present invention is an improvement upon the apparatus constituting the subject matter of my application Ser. No. 684,972 filed August 14, 1933, patented Oct. 16, 1934, No. 1,977,581.

According to my prior application just referred to, means is provided for indicating the maximum demand for electrical energy through the meter during a given period, the indicator being set back or retracted to an initial position at the end of the period, the maximum demand indication having been noted. The indicator then functions to operate to indicate the maximum demand during a succeeding period of time when the indication may be noted, and the indicator again retracted, this operation continuing for an indefinite period. When the maximum demand indicator is reset, no record remains of its having operated and its relation to maximum demands for other periods or the summation of the maximum demands can only exist by reason of the attendant noting them extraneously as in a notebook or the like.

Also, the maximum demand indicating member has an angular movement which is but a small fraction of 360°. The result is that unless the maximum demand is small, the divisions of the scale with which the pointer cooperates will have to be very small so that they are not readily legible with corresponding danger of inaccuracy in reading.

Also if there should be an error in the reading of a maximum demand (in fact there are legal rulings in some places that a fraction of a scale division cannot be read, but that the last scale division which the indicator has actually passed must be taken as the reading) such inaccuracies are not compensated for but are completely lost to the often considerable loss of the lighting company or others.

It is one of the objects of the present invention to provide means whereby the maximum demands for electric energy for a plurality of periods of time are integrated. This provides a means for retaining the readings in the register and the maximum demand for any particular period of time may be ascertained by the total summation of the maximum demands minus the integrated maximum demand reading for the next preceding period.

A further object of the invention is to provide a means for indicating the maximum demand upon a scale of amplified angularity whereby the readings are clearer and more accurately made. This advantage will exist whether or not the amplified indicating means is or is not retracted with the means by which it is operated, and whether or not there is any integration of maximum demands.

A further object of the invention is to promote accuracy of the ascertained maximum demand indications by compensating for inaccuracy of one reading, by a succeeding reading.

Other and ancillary objects of the invention will appear hereinafter.

In the accompanying drawings which illustrate the invention—

Fig. 3 is a rear elevation of the apparatus of Figs. 1 and 2;

Figure 5:
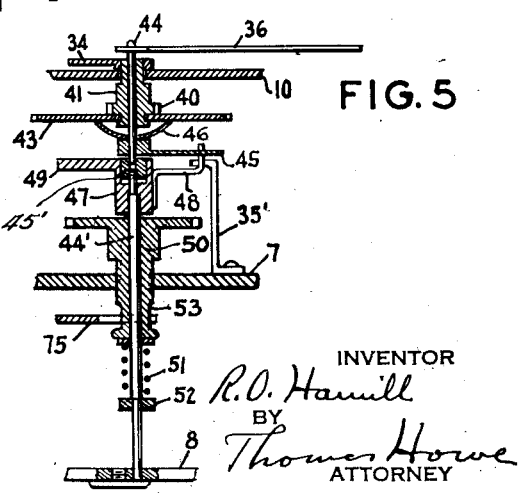

Fig. 5 is a section, on an enlarged scale, through the axis of the actuating shaft for the maximum demand indicator, and the apparatus for operating the same, certain of the parts being broken away, this view showing the manner of connection and disconnection of the maximum demand indicator operator with its actuating means and also the manner of the connection with the maximum demand integrating mechanism;

Fig. 6 is a partial horizontal section on the line 6—6 of Fig. 3 showing the manner of adjustably mounting the gear meshing with the worm upon the meter motor shaft;

Fig. 7 is an enlarged section on the line 7—7 of Fig. 6; and

Figure 1:
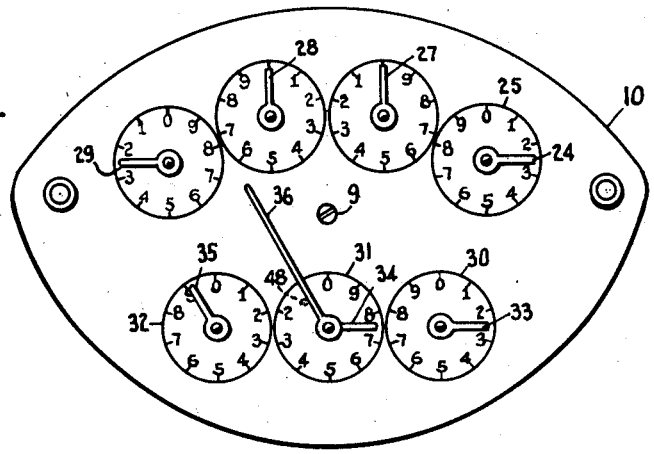
Fig. 1 is a front elevation of mechanism embodying the invention, the front cover of the meter being removed.
Figure 2:
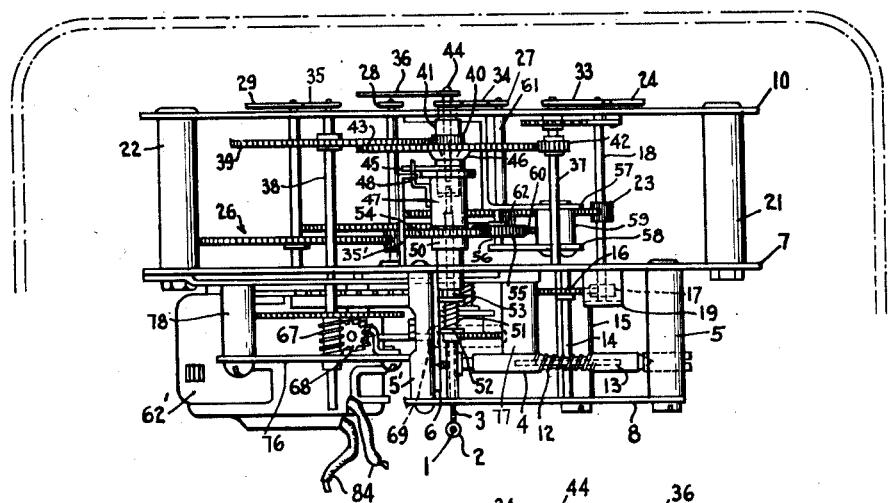
Fig. 2 is a bottom plan view of the apparatus of Fig. 1, the usual front meter cover being shown in dotted lines.

Fig. 8 is a fragmentary front view of the apparatus shown in Fig. 1 with the front plate and units dial broken away to show the pawl and ratchet for holding the maximum demand integrating register from retractile movement.

Referring to the drawings, there is therein shown a meter mechanism adapted to be used in connection with an alternating current electric circuit, although the invention may be employed in connection with direct current circuits. As is well known an integrating watt-hour meter for such circuits comprises an alternating currentmeter-motor driven by the electric energy to be measured, the shaft of the armature being connected by suitable gearing with a series of pointers moving over dials upon which are indicated the watt-hours to be measured.

Referring to the drawings, the shaft 1 of the meter motor rotor carries a worm 2 meshing with the worm wheel 3 fixed upon the shaft 4 rotatably mounted in the adjustable bearing plug 4' in the post 5, and the bracket 6. The post 5 is fixed in the plates 7 and 8 while the bracket is mounted to slide forwardly and rearwardly on the post 5' to move the worm wheel 3 toward or away from the worm 2. This sliding may be effected (see Fig. 6) by the screw 9 extending through the front plate 10, and screw threaded in the plate 7, the screw having a neck 11 fitting in the slot 11' in the lug 12' on one end of the bracket 6 and a head 10' on the screw prevents its withdrawal from the slot. Lugs 15' on the back of the bracket slide in the slot 13' in the post 5' and the bracket is secured to the post by a bolt 14' passing through the post and the slot 9' (which is elongated to permit sliding of the bracket along the post) in the bracket, a spring washer 16' between the head of the bolt and the bracket serving to press the bracket against the the post and frictionally hold the bracket firmly in any position to which it may be adjusted by the screw 9. It will be seen that by this arrangement the screw may be engaged by a screw-driver at the front of the register and the tightness of the fit of the worm wheel 3 with the worm 2 on the meter motor shaft may be adjusted as desired by simply turning the screw 9 in one direction or the other. This is an important feature because if the worm wheel 3 were pressed too tightly against the worm 2 the friction between them would very seriously affect the operation of the meter, and on the other hand if the wheel were too far away from the worm so that there was an unduly loose fit there would be corresponding lost motion and inaccuracy of operation. To effect the right adjustment has previously been a tedious cut and try method. With the adjustment provided by the construction described the relationship of the wheel and worm may be readily and accurately adjusted.

Carried by the shaft 4 is a worm 12 meshing with a worm wheel 13 fixed upon a shaft 14 rotatably mounted in the plates 7 and 8, the plate 8 being secured to and spaced from the plate 7 by the posts 5 and 15. Also fixed upon the shaft 14 is a spur gear 16 which meshes with a gear 17 fixed on a shaft 18 which is rotatably mounted in a bracket 19 extending from the plate 7, and in the supporting plate 10.

The supporting plates 7 and 10 are secured together and spaced apart by posts 21 and 22. Also fixed upon the shaft 18 is a pinion 23. Also fixed upon the shaft 18 is the units indicating pointer 24 movable over the dial 25. The pinion 23 meshes with a train of pinions 26 which is the well-known train of gearing for driving the other pointers 27, 28 and 29 moving over dials in a manner well-known in integrating watt-hour meters.

To provide the mechanism for noting the integrated maximum demand, dials, 30, 31 and 32 are provided on the front plate over which move the pointers 33, 34 and 35 respectively. An arm or pointer 36 may also be provided which not only indicates the maximum demand for a single period, but also serves as a handle to reset a certain portion of the mechanism, as will hereinafter appear, to an initial position at the end of such period, preferably against a suitably located stop 35'.

The pointers 33 and 35 are respectively fixed upon shafts 37 and 38 rotatably mounted in the plates 7 and 10. Fixed upon the shaft 38 is a gear 39 meshing with a smaller gear 40 (the ratio being 10 to 1), fixed upon a sleeve 41, while fixed upon the shaft 37 is a gear 42 meshing with a larger gear 43 fixed upon the sleeve 41. The pointer 34 is fixed upon the sleeve 41. The ratio of the gearing is such that the shaft 38 will move 1/10th as fast as the sleeve 41, while the shaft 37 will move ten times as fast as the sleeve 41 which is appropriate to the pointer 33 indicating units of kilowatt hours, the pointer 34 indicating the 10s of kilwatt hours and the pointer 35 indicating the 100s of kilowatt hours.

The sleeve 41 is rotatably mounted upon the rotatable shaft 44 to which the arm 36 is fixed. Also fixed upon the shaft 44 is an arm 45 and the sleeve 41 is frictionally connected with the shaft by a spring washer 46 upon the shaft and bearing against the arm 45 and the gear 43.

The shaft 44 has its end rotatably mounted in the nut 45' screw threaded on the shaft 44'. This prevents the sleeve 47 from being forced against the arm 45 and the screw threading is of such extent that the nut, when screwed onto the shaft to its limit, will not bind the sleeve 47 but permit it to turn easily on the shaft 44'. The sleeve 47 is easily rotatable about the shaft 44' and nut 45', and fixed upon the sleeve is the projection 48 extending into the path of the arm 45 to move the same. Also fixed upon the sleeve 47 is an off-center weight 49 tending, by gravity, to turn the sleeve 47 and its arm 48 away from the arm 45 into their initial position against the stop 35'. Rotatable and slidable upon a shaft 44', having its end rotatably mounted in the sleeve 47, is a sleeve 50 which is pressed toward the sleeve 47 by means of a coiled spring 51 interposed between a collar 52 fixed against longitudinal movement on the shaft, and the end of the sleeve 50. When the spring is free to press the ends of the sleeves together they are in frictional driving relation. The sleeve 50 is, however, provided with a circumferential groove 53 into which may engage the fork of a lever 73' for moving the sleeve 50 against the pressure of the spring 51 and the sleeves 47 and 50 out of frictional engagement.

Fixed upon the sleeve 50 is the gear 54 which meshes with the gear 55, being of such width as to be maintained in gear when the sleeve 50 is shifted longitudinally as above referred to. The pinion 55 is mounted upon the shaft 56 rotatably mounted in the plates 57 and 58 secured together and spaced apart by the posts 59, the supporting structure, comprising the plates 57 and 58 and the posts 59, being mounted upon the supporting plate 10.

The gear 55 meshes with the gear 60 fixed on a shaft 61 rotatably mounted in the plates 10 and 7. Also fixed upon the shaft 61 is a gear 62 which meshes with one of the gears 26 of the train operating the integrating pointers 24, 27, 28, and 29, which train is driven from the meter motor as has been described. The projection 48 is thus driven forward by the meter motor so long as the sleeves 47 and 50 are frictionally engaged.

To provide for the opening of the friction clutch connection between the sleeves 47 and 50, so that the projection 48 may be returned to its initial position by the weight 49 at suitably timed intervals, a synchronous motor 62', preferably self-starting, of which suitable types are well known, acts as a timing and actuating device to control the friction clutch connection between the sleeves.

Figure 4:
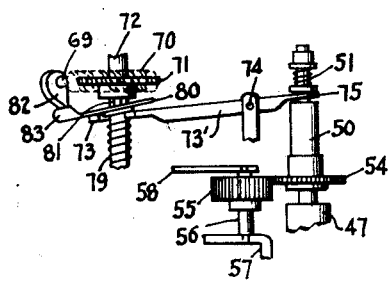
Fig. 4 is a fragmentary view, on an enlarged scale, showing the means whereby the timing synchronous motor operates the clutch controlling the connection of the actuator for the maximum demand indicator with its driving means.

The motor being in operation it will rotate its armature shaft 63 and the spur gear 64 fixed thereon. The spur gear 64 meshes with and drives another spur gear 65 fixed upon the shaft 66 to which is also fixed the worm 67. Meshing with the worm 67 is a worm wheel 68 fixed on the shaft 69 upon which is also fixed the worm 70 meshing with the worm wheel 71 fixed upon the shaft 72 which is rotatably mounted in the plates 7 and 76, the latter plate being secured to and spaced from the plate 7 by posts 77 and 78. Embracing the shaft 72 is the forked end 73 of the lever 73' pivoted at 74 and having at its other end a fork 75 entering within the groove 53 of the sleeve 50 to shift the sleeve 50 out of frictional clutching engagement with the sleeve 47 as before referred to, the spring 51 tending to press the sleeve 50 into such engagement. The forked end 73 of the lever is pressed by the spring 79 (see Fig. 4) against the collar 80 which is loose upon the shaft but turns therewith by reason of the fact of diammetric ribs 81 on the hub of the gear 71 engaging in corresponding recesses in the flat collar 80, the gear 71 being fixed to the shaft 72. The spring 79 normally holds the forked end 73 flatly against the collar 80 and the collar in a plane substantially perpendicular to the axis of the shaft 72. The collar 80, however, may be tilted upon the ribs 81 (see Fig. 4) by means of a rotating cam 82 coming into engagement with a lug 83 projecting from the collar 80 at one side. When the collar 80 is so tilted it will be apparent that the forked end 73 of the lever 73' will be shifted along the shaft 72 whereupon the lever will be turned about its pivot 74 and its forked end 75 will draw the sleeve 50 out of frictional engagement with the sleeve 47.

The cam 82 is fixed upon the shaft 69 rotatably mounted in brackets upon the plate 76 and carrying the worm 70 and the worm wheel 68 which is geared to the rotor of the synchronous motor as above referred to. The terminals 84 of the synchronous motor are to be connected across a phase of alternating current and when this is done, and the rotor (if not self-starting) is given a start to bring it up to synchronous speed, it will then be driven at a speed bearing a fixed relation to the frequency of the alternating current supplied to the motor, i. e. will be maintained in synchronism for reasons as are well understood in connection with alternating current electric motors. Also the speed at which the rotor will be driven will be dependent upon the design of the rotor and stator as is well understood in the art.

The motor being in operation it will rotate the worm 70 and the cam 82. The motor will, therefore, rotate the gear 71 and with it the collar 80. The ratio of movement is so designed that the collar 80 will move a very slight part of a revolution, while the cam 82 is making a complete revolution. When, therefore, the collar 80 is in position such that the lug 83 is adapted to be contacted by the cam 82, the latter will engage the lug, tilt the collar and disengage the sleeves 50 and 47, thereby permitting the sleeve 47 and its actuating projection 48 to return to their initial positions by the biasing weight 49. As soon, however, as the momentary registration of the lug 83 and the cam 82 has passed, the collar 80 will again resume its normal position and the sleeve 47 and its actuating projection 48 will be again connected in driving relation to the meter-motor-mechanism and will continue its advance until the lug 83 is again actuated by the cam 82. It will be apparent that the lug 83 will be actuated by the cam 82 once for each revolution of the collar 80. The construction is therefore made such that the time of revolution of the collar will be the time during which it is desired that the actuating arm 48 shall be advanced.

It will be apparent that the alternating synchronous motor driving the collar 80 and actuating the sleeve 50, will be the timing mechanism, because the frequency being a fixed number of alternations per second and the revolutions of the motor (and connected apparatus) having a fixed relation to the frequency, the operations will be appropriately timed.

To briefly trace the operation of the apparatus, the integrated kilowatt hours supplied through the meter will be indicated in the usual way by the position of the pointers 24, 27, 28, and 29 on their respective dials. In connection with the maximum demand indications, the actuating projection 48 will be driven forward by connection with the watt hour integrating mechanism referred to for a predetermined period, say one-half hour. This is timed by the synchronous motor which controls the friction clutch establishing the driving connection for the projection 48 and when such driving connection is open this projection is returned to its initial position by the gravitational bias of the weight 49. The disconnection of the actuating projection from the driving means, however, is only momentary and upon the reestablishment of such connections the projection is again driven forward for the predetermined interval of time when it is again released and returns to its initial position under the action of its biasing weight. This advancement of the actuating projection 48 for intervals of say one-half an hour, it being retracted by the weight at the end of each half hour, may continue for a period of time, say a month, when an attendant will find the arm 45 and the pointer 36, which assumes a corresponding position, in a position corresponding to the maximum kilowatt hours demanded through the meter for any of the half hour periods, above referred to, during the month. In short, the position of the arm 45 and the pointer 36 will show the maximum demand through the meter for the month. The attendant may then push the arm 36 and its connected arm 45 back to its initial or zero position when it will, during the succeeding month, be positioned according to the actuations of the projection 48 and at the end of the next month the maximum demand can be noted and the arm 36 returned to its zero position, and so the operation may be continued indefinitely.

It will be seen that as the actuating projection 48 advances the arm 45 it will also rotate the sleeve 41 through the frictional connection established by the spring washer 46 which will cause the pointers 33, 34, and 35 to move over their respective dials in proportion to the movement of the arm 45 and according to their respective gearing as above referred to. When the arm 36 and the projection 45 are retracted to the zero or initial position, this movement of the arms 36 and 45 is not accompanied by reverse movement of the pointers 33, 34, and 35, which are geared together, because these pointers are unidirectional, being held against backward movement by means of a ratchet wheel 84 fixed on the units shaft 37 and held against backward movement by the spring pressed dog 85 pivoted upon the plate 10.

The retracting movement of the arm 36, while the pointers 33, 34, and 35 are held against such movement, is permitted by the frictional connection made by the spring washer 46. It will be observed that in retracting the arm 45 to its initial position as referred to, it will carry with it the projection 48 so that both will be limited in their inital postions by coming against the stop 35′ and will simultaneously take up their forward movement from that position.

The maximum demand for any given month (or other period of time) is not only indicated by the position of the pointer 36 but also by the positions of the pointers 33, 34 and 35 with relation to their respective dials. This is of advantage because the angular movement of the pointer 36 is necessarily limited so that any scale with which it is used must be correspondingly limited and the graduations are often too fine for accurate reading. By providing the pointers 33, 34, and 35, geared to the projection 45, as above described, the observation scales may be angularly magnified so as to include scales or dials extending for 360° whereby the indications are more readily and accurately read.

In addition, this construction provides a means whereby the integrations of the maximum demands of successive months are integrated and the maximum demand for any month may be determined at the end of that month by subtracting the reading of the dials 30, 31, and 32 at the end of the preceding month. This method of determining the maximum demand for a month is preferable to simply observing the position of a pointer such as 36 at the end of the month and then resetting it, when all record is lost, because by the integration and subtraction method, correction of the readings for one month will be effected in the readings of the following month. If the indicating pointer were beyond a certain scale division but had not reached the next scale division the reader of the meter might not take account of the fractional division. In fact where a division represents a kilowatt hour, in some places the legal rules will not permit readings of fractional divisions but only up to the scale division which has actually been passed. The loss occasioned by the omission of these fractional scale divisions is often considerable. With the integration and subtraction method afforded by the present mechanism, however, any fractional scale division not included in the readings for one month will be noted and included in the reading for the next month so that a considerable loss to the electric company is prevented, and it will be observed that any inaccuracies of reading of one month will be corrected in the reading of the succeeding month.

The integration of the maximum demands also provides a record which is not provided where the maximum demand indicator is simply reset at the end of the month.

While the invention has been illustrated in what are considered its best applications it may have other embodiments without departing from its spirit and is not therefore limited to the structures shown in the drawings.

What I claim is:

1. In a maximum demand indicating meter, the combination with an electric meter motor shaft, of means operated thereby for indicating the maximum demand through the meter motor for each of a plurality of time intervals and means driven by said shaft for integrating the maximum demands of said time intervals.

2. In a maximum demand indicating meter, the combination with a meter motor shaft, of a member driven thereby, driving connections between said shaft and member permitting retraction of said member independently of said shaft, means for retracting said member, a second retractable member driven by the aforesaid member, a driving connection between said members permitting retraction of the first mentioned member independently of the said second member, unidirectional integrating-registering means and frictional driving means between said second member and said integrating-registering means.

3. In a maximum demand indicating meter, the combination with a meter motor shaft, of a member driven thereby, frictional driving means between said shaft and member permitting retraction of said member independently of said shaft, means for retracting said member, a second retractible member driven by the aforesaid member, a driving connection between said members permitting retraction of the first mentioned member independently of the said second member, and unidirectional integrating-registering means operatively connected with said second member and advanced in unison with advance movement thereof.

4. In a maximum demand indicating meter, the combination with a meter motor shaft, of a member driven thereby, driving connections between said shaft and member permitting retractoin of said member independently of said shaft, means for retracting said member, a second member driven by the aforesaid member, a driving connection between said members permitting retraction of the first mentioned member independently of the said second member, integrating-registering means and driving connections between said integrating-registering means and said second member permitting retraction of said second member independently of said integrating-registering means and operating to advance said integrating-registering means in unison with advance movement of said second member.

5. In a maximum demand indicating meter, the combination with a meter motor shaft, of a member driven thereby, driving connections between said shaft and member permitting retraction of said member independently of said shaft, time controlled means for retracting said member, a second retractible member driven by the aforesaid member, a driving connection between said members permitting retraction of the first mentioned member independently of the said second member, unidirectional integrating-registering means and frictional driving means for advancing the latter means in unison with advance movement of said second member.

6. In an electric meter, the combination with a meter motor shaft of a register comprising a face and registering mechanism driven by said shaft, the driving connection between said shaft and mechanism comprising a worm and a wheel engaging therewith, said wheel being movable to adjust it toward and away from said worm and means for effecting said adjustment of said wheel, the last mentioned means extending to a point accessible from the said face of the register.

7. In a maximum demand indicating meter, the combination with an electric meter motor shaft, of means operated thereby for indicating the maximum demand, per interval, of a series of time intervals, and means driven by said shaft for integrating the said maximum demands for a plurality of said series of intervals.

8. In a maximum demand indicating meter, the combination with an electric meter motor shaft, of means operated thereby for indicating the maximum demand, per interval, of a series of time intervals, and means driven by said shaft for indicating the summation of the said maximum demands for a plurality of said series of time intervals.

9. In a maximum demand indicating meter, the combination with an electric meter motor shaft, of a member having an initial position and driven forward by said shaft, timed means for returning said member to its initial position, a second member moved forward by the first mentioned member when it is driven forward but remaining, during the return movement of the first mentioned member, in the position to which it has been driven by said first mentioned member, whereby said second member takes up a position according to the maximum demand per interval for a series of time intervals, said second member being retractible to an initial position at the end of the series and means responsive to forward movement of said second member for indicating the summation of the said maximum demands for a plurality of said series of time intervals.

10. The combination with an electric meter motor shaft, of a member driven forward thereby, timed means for detachably connecting said member in driving relation to said shaft, said member having an initial position and moving forward therefrom when connected with said shaft, means for returning said member to its initial position when disconnected from said shaft, a second member moved forward by the first mentioned member when it is driven by said shaft but remaining, during the return movement of the first mentioned member, in the position to which it has been driven by the said first mentioned member whereby said second member takes up a position according to the maximum demand per interval for a series of time intervals, said second member being retractible to an initial position at the end of the said series of intervals, and means responsive to forward movement of said second member for indicating the summation of the said maximum demands for a plurality of said series of time intervals.

11. The combination with an electric meter motor shaft, of a member driven forward thereby, timed means for detachably connecting said member in driving relation to said shaft, said member having an initial position and moving forward therefrom when connected with said shaft, means for returning said member to its initial position when disconnected from said shaft, a second member moved forward by the first mentioned member when it is driven by said shaft but remaining, during the return movement of the first mentioned member, in the position to which it has been driven by the said first mentioned member whereby said second member takes up a position according to the maximum demand per interval for a series of time intervals, said second member being retractible to an initial position at the end of said series of intervals, means for indicating the summation of the said maximum demands for a plurality of said series of time intervals, driving means for connecting said summation indicating means with said second member and means for preventing said summation indicating means from being retracted.

12. The combination with an electric meter motor shaft, of a member driven forward thereby, timed means for detachably connecting said member in driving relation to said shaft, said member having an initial position and moving forward therefrom when connected with said shaft, means for returning said member to its initial position when disconnected from said shaft, a second member moved forward by the first mentioned member when it is driven by said shaft but remaining, during the return movement of the first mentioned member, in the position to which it has been driven by the said first mentioned member whereby said second member takes up a position according to the maximum demand per interval for a series of time intervals, said second member being retractible to an initial position at the end of said series of intervals, means for indicating the summation of the said maximum demands for a plurality of said series of time intervals, driving means including frictional driving means, for connecting said summation indicating means with said second member and means for preventing said summation indicating means from being retracted.

13. The combination with an integrating electricity meter, of a retractible maximum demand indicator, actuating means therefor correlated with the meter, means for resetting said actuating means independently of the meter and of said indicator at the expiration of predetermined time intervals, unidirectional means for integrating the maximum demands over a plurality of said time intervals, and driving means between said indicator and said unidirectional integrating means for advancing the latter means in unison with advance movement of said indicator.

RET O. HAMILL.